United States Patent
Chawla et al.

(10) Patent No.: US 8,299,756 B2
(45) Date of Patent: Oct. 30, 2012

(54) SYSTEM AND METHOD FOR BATTERY CONTROL

(75) Inventors: Monika Chawla, Bangalore (IN); Amol Rajaram Kolwalkar, Bangalore (IN); Ajit Wasant Kane, Bangalore (IN); Ajith Kuttannair Kumar, Erie, PA (US); Stephen Matthew Pelkowski, Erie, PA (US); Lembit Salasoo, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 1038 days.

(21) Appl. No.: 11/982,491

(22) Filed: Nov. 1, 2007

(65) Prior Publication Data

US 2009/0115371 A1     May 7, 2009

(51) Int. Cl.
*H02J 7/00* (2006.01)

(52) U.S. Cl. .................. 320/132; 320/134; 324/427

(58) Field of Classification Search .................. 320/132, 320/427; 324/427
See application file for complete search history.

(56) References Cited

U.S. PATENT DOCUMENTS

| | | | |
|---|---|---|---|
| 6,612,246 B2 * | 9/2003 | Kumar | 105/34.2 |
| 2004/0000892 A1 | 1/2004 | Jae-Seung | |
| 2004/0148817 A1 | 8/2004 | Kagoshima et al. | |
| 2004/0222768 A1 | 11/2004 | Moore et al. | |
| 2006/0244459 A1 | 11/2006 | Katzenberger | |
| 2007/0139008 A1 | 6/2007 | Sterz et al. | |
| 2007/0251741 A1 * | 11/2007 | Kidston et al. | 180/65.2 |

OTHER PUBLICATIONS

PCT International Search Report dated Aug. 10, 2009.
Patent application No. 2008319197, Australian first OA Jan. 21, 2011.

* cited by examiner

*Primary Examiner* — Samuel Berhanu
(74) *Attorney, Agent, or Firm* — Francis T. Coppa

(57) ABSTRACT

A system and method are provided for battery control of hybrid vehicles such as, but not limited to, hybrid locomotives. The system and method are implemented to sense a present state of charge (SoC) of one or more batteries and generate present SoC data there from, sense a present excursion defined by a relationship represented as maximum SoC−minimum SoC for a desired cycle and generate present excursion data there from, and control the one or more battery power/current charging limits in response to the present SoC data and the present excursion data.

13 Claims, 2 Drawing Sheets

SYSTEM AND METHOD FOR BATTERY CONTROL

BACKGROUND

The invention relates generally to energy storage in batteries, and in particular, to a system and method for storing a part of the dynamic braking energy in hybrid vehicle including, but not limited to, locomotive and off highway vehicle batteries and then using this energy during motoring to save fuel.

Hybrid locomotives and off highway vehicles operate by storing a part of the dynamic braking energy in batteries and then using this energy during motoring to save fuel. Maximum utilization of the batteries enhances the fuel savings. The batteries can be controlled at higher power/current levels to provide better fuel saving initially; but repetitive cycling of the battery at these high power/current levels leads to higher degradation resulting in lower fuel savings over the life of the battery.

Batteries in hybrid locomotives and off highway vehicles have traditionally been controlled at a constant power/current limit based on operational and safety limits. The benefits from a hybrid can be maximized however only if the batteries are charged at maximum possible charge power/current. Further, if controlled at a constant charge power/current throughout a mission, the batteries are charged at higher rates for events where they could have been charged at lower rates. This results in higher degradation in the batteries thereby reducing their operating life.

One known technique for addressing the foregoing problems includes using two different types of energy storage devices with different characteristics. One of the devices is of high energy capacity but low power rating; while the other device is a low energy capacity battery with a high power rating. Small excursions are resolved by the high power energy storage device(s); while the bigger excursions are resolved by the high energy device(s). These high power energy storage devices generally comprise ultracapacitors or high power batteries; while the high energy devices generally comprise large capacity batteries. Use of two different types of energy storage devices undesirable adds complexity and cost to the system Accordingly, there exists a need for a battery control scheme that allows battery charging at higher rates only during cycles where excess braking power is available. It would be advantageous if the battery control scheme employed only the present state of charge and excursion during a mission to compute the power/current control limits without any reliance on prior knowledge of drive cycles. It would be further advantageous if the battery control scheme could be uniformly applied to all locomotives running on different missions while achieving fuel saving over both a mission and lifetime.

BRIEF DESCRIPTION

Briefly, in accordance with one embodiment of the present invention, a system and method are provided for battery control of hybrid vehicles, including without limitation, locomotives.

The method, in one embodiment, includes:

sensing a present state of charge (SoC) of one or more batteries and generating present SoC data there from;

sensing a present excursion defined by a relationship represented as maximum SoC−minimum SoC for a desired cycle and generating present excursion data there from; and controlling power/current charging limits for the one or more batteries in response to the present SoC data and the present excursion data.

According to another embodiment, a battery control system comprises a battery charge sensor configured to sense and generate data corresponding to a present state of charge (SoC) of one or more batteries, and further configured to sense and generate data corresponding to a present excursion defined by a relationship represented as maximum SoC−minimum SoC for a desired cycle; and a battery charge controller configured to control power/current charging limits of the one or more batteries in response to the present SoC data and the present excursion data.

According to yet another embodiment, a battery control system is provided for enhancing hybrid vehicle battery performance and fuel savings via modulation of battery charging and discharging current control limits based on a relationship defined as Control Limit $(P,I)=f(Excursion, SoC)$, where P is total battery charging power in Amp hours, I is battery charging/discharging current, SoC means state of charge of the battery cells, and Excursion means the magnitude of a cycle defined as maximum SoC−minimum SoC for a cycle.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The following description presents a system and method according to one embodiment, for battery control of hybrid vehicles such as, but not limited to, locomotives in order to provide enhanced battery performance and fuel savings. Hybrid locomotives, as stated herein before, operate by storing a part of the dynamic braking energy in batteries and then using this energy during motoring to save fuel. The fuel savings vary with variation in number of batteries and charge and discharge limits. Generally, an increase in charge current was found by the present inventors to increase the fuel savings, whereas the discharge current was found to have almost no impact on fuel savings in hybrid vehicles of interest.

The following terms, as used herein, are defined as follows:

SoC means state of charge of the cells.

Excursion means the magnitude of a cycle. It is defined as maximum SoC−minimum SoC for a cycle.

Fuel savings (FS) means the benefits in terms of fuel saved with a hybrid vehicle such as, without limitation, a locomotive. It is defined in percent as $$FS (\text{in } \%) = \frac{\text{Engine Energy from (Traditional Vehicle} - \text{Hybrid Vehicle)}}{\text{Engine Energy from Traditional Vehicle}} \times 100.$$

Figure 1:
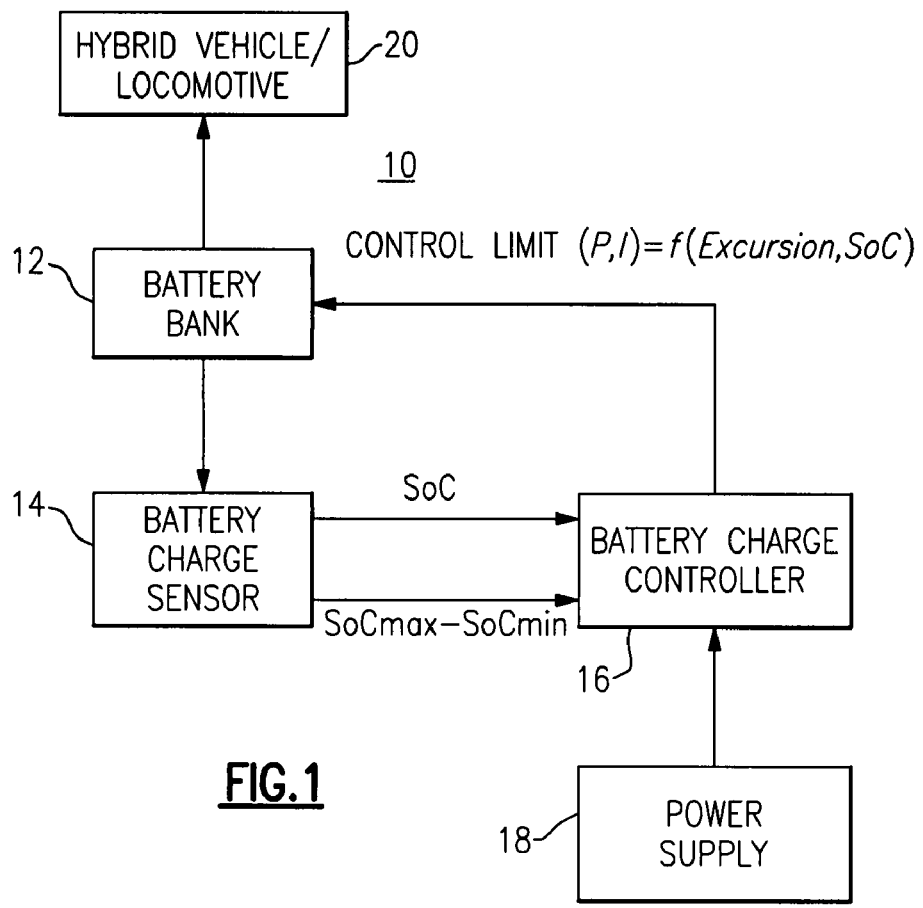
FIG. 1 illustrates a simplified block diagram of a battery control system in accordance with one embodiment of the present invention.

Turning now to the drawings, FIG. 1 illustrates a simplified block diagram of a battery control system 10 in accordance with one embodiment of the present invention. Battery control system 10 is configured in one embodiment to perform a multi-step modulation between the desired operational power/current control limits, such that only those cycles are charged at higher rates where excess braking power is available. No prior knowledge of the drive cycles is required, as the control scheme utilizes only the present state of charge and excursion data during a mission to determine the requisite power/current control limits. As such, this is a uniform control scheme that can be applied for all hybrid vehicles 20, such as hybrid locomotives, for example, running on different missions. The modulation implemented by the application of the control scheme achieves improved battery performance and fuel savings over a mission and also over battery life, when compared with known control schemes that employ constant charge power/current control schemes throughout the mission of the batteries.

With continued reference to FIG. 1, battery control system 10 includes a battery charge sensor 14 that is configured to continuously monitor the present state of charge, including charge excursion data associated with the batteries 12. Those skilled in the art will appreciate that any number of batteries, whether it is one or more, can be controlled via the control scheme described herein.

Battery control system 10 further includes a battery charge controller 16 that is configured to control charge and discharge limits for the batteries 12. Battery charge controller 16 functions according to one embodiment in response to a desired transfer function developed to increase hybrid vehicle fuel savings. The control limits can be defined as Control Limit (P, I)=f(Excursion, SoC), where P is total battery charging power in Amp hours, I is battery charging/discharging current, and Excursion and SoC are as defined herein above.

The transfer function current control limits for one embodiment were found to achieve average fuel savings of 10% over the first year with a 28 battery system. Another embodiment was found suitable to achieve average fuel savings of 8% with a 22 battery system. Yet another embodiment was found suitable to achieve average fuel savings of 6% with a 16 battery system.

Bigger excursion sub cycles were found to be affected most by an increase in charging current; whereas the lower excursion sub cycles were found to remain almost the same.

Figure 2:
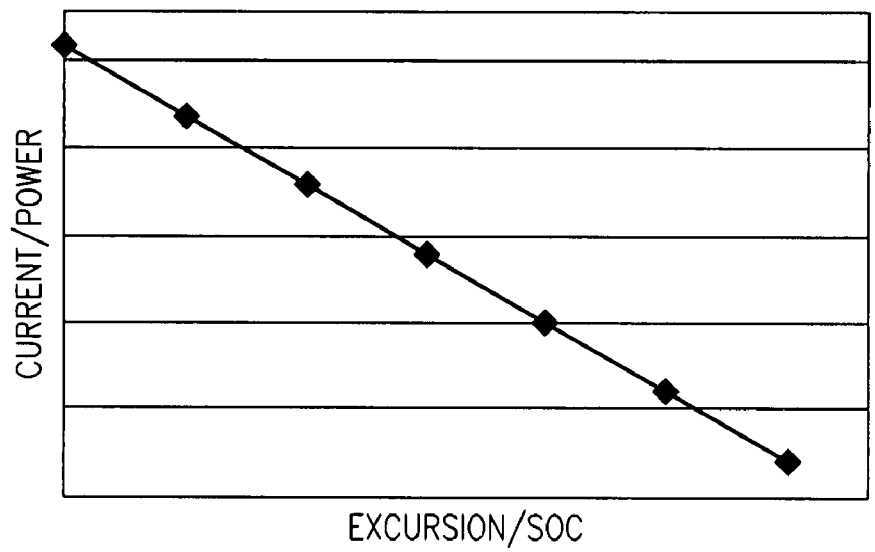
FIG. 2 is a graph illustrating a control strategy for charging a battery or battery bank in accordance with one embodiment using the battery control system depicted in FIG. 1.
Figure 3:
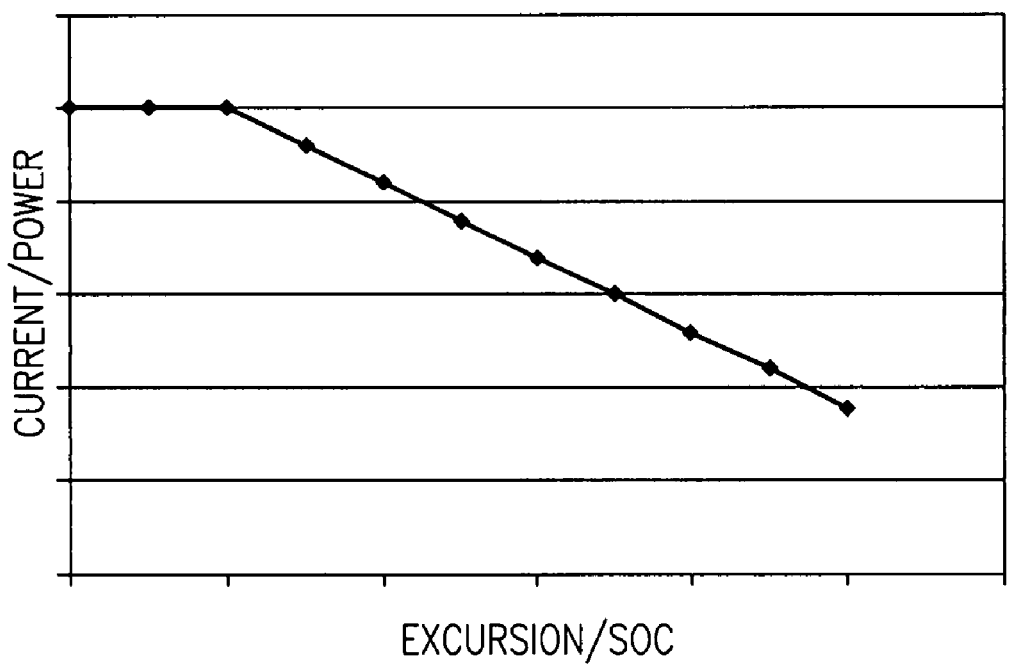
FIG. 3 is a graph illustrating a control strategy for charging a battery or battery bank in accordance with another embodiment using the battery control system depicted in FIG. 1.
Figure 4:
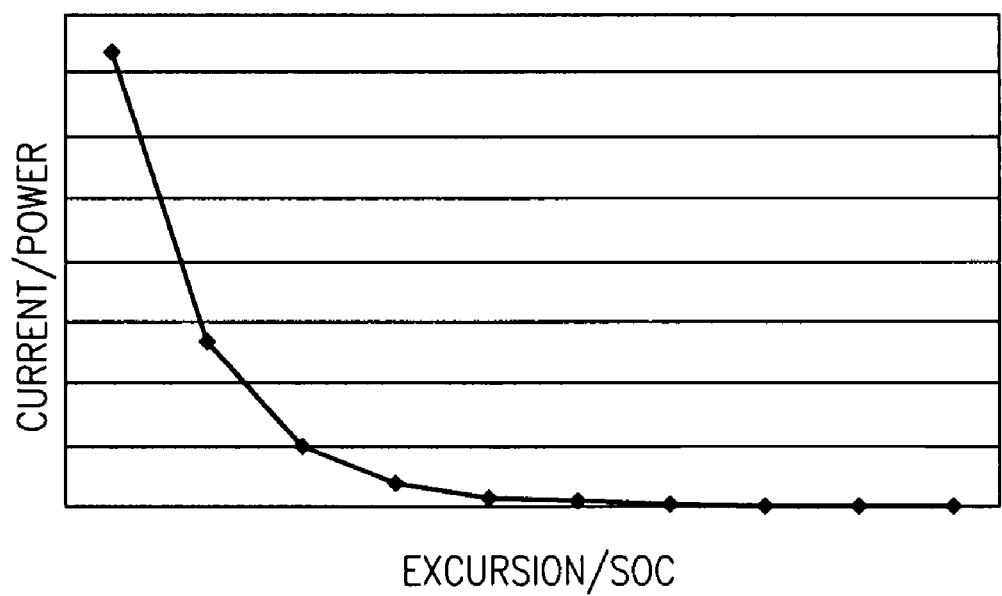
FIG. 4 is a graph illustrating a control strategy for charging a battery or battery bank in accordance with yet another embodiment using the battery control system depicted in FIG. 1.

Control strategies can be modified for particular type of hybrid vehicles and missions. FIGS. 2-4, for example, depict three alterative battery control strategies, including linear, linear with delay, and exponential modulation schemes respectively. The present invention is not so limited to these three battery control strategies however, and those skilled in the art will readily appreciate that many other battery control strategies can be just as easily employed to achieve the desired enhanced battery performance and hybrid vehicle fuel savings in accordance with the principles described herein.

Looking now at FIG. 2, a graph illustrates a linear control strategy for charging a battery or battery bank in accordance with one embodiment. The control strategy for this embodiment uses linear control such that the battery charging current becomes smaller as the magnitude of the battery excursions become smaller, since, as stated herein before, bigger excursion sub cycles were found to be affected most by an increase in charging current; whereas the lower excursion sub cycles were found to remain almost the same.

FIG. 3 is a graph illustrating a linear control with delay strategy for charging a battery or battery bank in accordance with another embodiment. The control strategy for this embodiment uses a constant large battery charging current for any excursion that exceeds a predetermined limit. The battery charging current then becomes smaller as the magnitude of the battery excursion become smaller for any excursion below the predetermined limit.

FIG. 4 is a graph illustrating an exponential control strategy for charging a battery or battery bank in accordance with yet another embodiment. The control strategy for this embodiment uses a battery charging current that decreases in magnitude exponentially as the battery excursion becomes smaller and increases in magnitude exponentially as the battery excursion becomes larger.

In summary explanation, a system and method for battery control of hybrid vehicles, including without limitation, locomotives achieves the technical effects of enhanced battery performance and higher fuel savings when compared to traditional techniques of controlling the power flow to/from the batteries at constant current rates which are an average between the two control limits. Other technical effects include 1) lower battery degradation and hence better performance over life, 2) a control scheme that does not require prior information about driving cycles, a control scheme that is easy to implement, and 3) a control scheme that is less costly to implement than the traditional hardware based approach.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling stored battery charge, the method comprising:

sensing a present state of charge (SoC) of one or more batteries and generating present SoC data there from;

sensing a present excursion defined by a relationship represented as maximum SoC−minimum soC for a desired cycle and generating present excursion data there from;

modulating a transfer function power and current charge rate control limit based on the present SoC data and the present excursion data for the one or more batteries by adjusting the power and current charge and discharge control limits upward as the excursion increases above a desired limit, and adjusting the power and current charge and discharge control limits downward as the excursion decreases below a desired limit; and powering a hybrid vehicle during a mission using the one or more batteries while controlling power/current charging limits for the one or more batteries such that battery life and fuel consumption rate for the hybrid vehicle is increased above the battery life and fuel consumption rate using a constant power and current charging system.

2. The method for controlling stored battery charge according to claim 1, wherein the power and current charge and discharge control limits are adjusted in a linear fashion.

3. The method for controlling stored battery charge according to claim 1, wherein the power and current charge and discharge control limits are adjusted in a non-linear fashion.

4. The method for controlling stored battery charge according to claim 1, wherein the hybrid vehicle comprises a locomotive.

5. The method for controlling stored battery charge according to claim 1, wherein powering the hybrid vehicle during a the mission further comprises controlling the power and current charging limits for the one or more batteries in response to the present SoC data and the present excursion data such that only those cycles are charged at higher rates where excess braking power is available.

6. A battery control system comprising:
a battery charge sensor configured to sense and generate data corresponding to a present state of charge (SoC) of one or more batteries, and further configured to sense and generate data corresponding to a present excursion defined by a relationship represented as maximum SoC−minimum SoC for a desired cycle;
a battery controller configured to modulate power and current charge and discharge control limits based on the present SoC data and the present excursion data for the one or more batteries by adjusting the power and current charge and discharge control limits upward as the excursion increases above a desired limit, and adjusting the power and current charge and discharge control limits downward as the excursion decreases below a desired limit; and
powering a hybrid vehicle during a mission using the one or more batteries while controlling power and current charging limits for the one or more batteries such that battery life and fuel consumption rate for the hybrid vehicle is increased above the battery life and fuel consumption rate using a constant power and current charging.

7. The battery control system according to claim 6, wherein the modulation is configured to provide adjustment of the power and current charge and discharge control limits in a linear fashion.

8. The battery control system according to claim 6, wherein the modulation is configured to provide adjustment of the power and current charge and discharge control limits in a non-linear fashion.

9. The battery control system according to claim 6, wherein the hybrid vehicle comprises a locomotive.

10. A battery control system for a hybrid vehicle, comprising:
a battery charge sensor configured to continuously monitor the present state of charge of a battery bank having one or more batteries; and
a battery charge controller configured to modulate charge and discharge control limits for the one or more batteries such that battery life and fuel consumption rate for the hybrid vehicle is increased above the battery life and fuel consumption rate using a constant power/current charging system when the hybrid vehicle is powered during a mission, wherein the control limits is defined as:
Control Limit (P, I)=f (Excursion, SoC), where P is total battery charging power in Amp hours, I is battery charging/discharging current, SoC is the present state of charge of the one or more batteries, and Excursion is a magnitude of a cycle defined as maximum SoC−minimum SoC for the cycle,
wherein the modulation is configured to provide adjustment of the charge and discharge control limits upward as the excursion increases above a desired limit, and adjustment of the charge and discharge control limits downward as the excursion decreases below a desired limit.

11. The battery control system according to claim 10, wherein the modulation is configured to provide adjustment of the power and current charge and discharge control limits in a linear fashion.

12. The battery control system according to claim 10, wherein the modulation is configured to provide adjustment of the power/current charge and discharge control limits in a non-linear fashion.

13. The battery control system according to claim 10, wherein the hybrid vehicle comprises a locomotive.

* * * * *